United States Patent

[11] 3,523,522

| [72] | Inventors | Edwin C. Whitehead<br>Sloatsburg, New York;<br>Jack Isreeli, Mamaroneck, New York |
|---|---|---|
| [21] | Appl. No. | 420,866 |
| [22] | Filed | Dec. 24, 1964 |
| [45] | Patented: | Aug. 11, 1970 |
| [73] | Assignee | Technicon Corporation<br>Chauncey, New York<br>a Corp. of New York |

[54] APPARATUS FOR CORRELATING BODY FLUID SAMPLES WITH RESPECTIVE SOURCE INDIVIDUALS
6 Claims, 10 Drawing Figs.

[52] U.S. Cl.................................... 128/2,
235/61.11, 346/33, 128/1
[51] Int. Cl....................................... A61b 5/00
[50] Field of Search.......................... 128/1, 2;
33/174D; 128/2.06, 2.1;
346/33; 235/61.1, 61.9, 61.11

[56] References Cited
UNITED STATES PATENTS

| 2,342,517 | 2/1944 | Nevin............... | 235/61.12XR |
| 2,975,282 | 3/1961 | Schaffer............ | 235/61.11XR |
| 2,980,319 | 4/1961 | Clemens et al.... | 235/61.11XR |
| 3,072,120 | 1/1963 | Sharp et al........ | 128/215 |
| 3,255,312 | 6/1966 | Howard............. | 235/61.11XR |
| 3,266,298 | 8/1966 | Whitehead et al... | 346/33XR |
| 3,320,618 | 5/1967 | Kuch et al......... | 346/33XR |

*Primary Examiner*— Richard A. Gaudet
*Assistant Examiner*— Kyle L. Howell
*Attorney*— Harry Cohen ABSTRACT: Apparatus for ensuring correlation of the source of a sample with the analysis thereof, including: a token which is attached to the source individual and which bears machine readable indicia uniquely identifying this individual; a sample container for receiving a sample from this individual; and a mechanism for reading out the indicia from said token and for providing said container with correlated machine readable indicia contemporaneously with the withdrawal of the sample from this individual into said container.

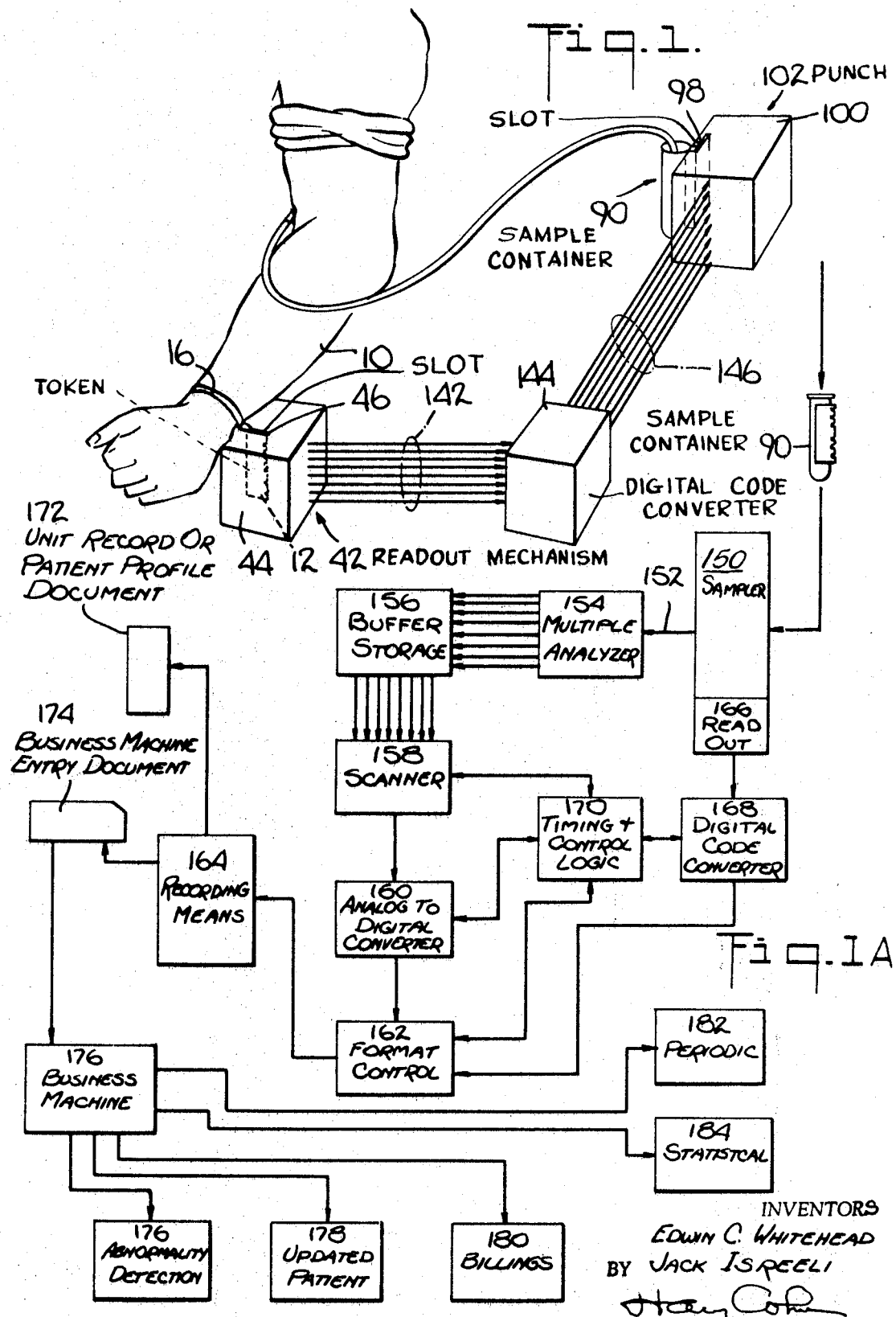

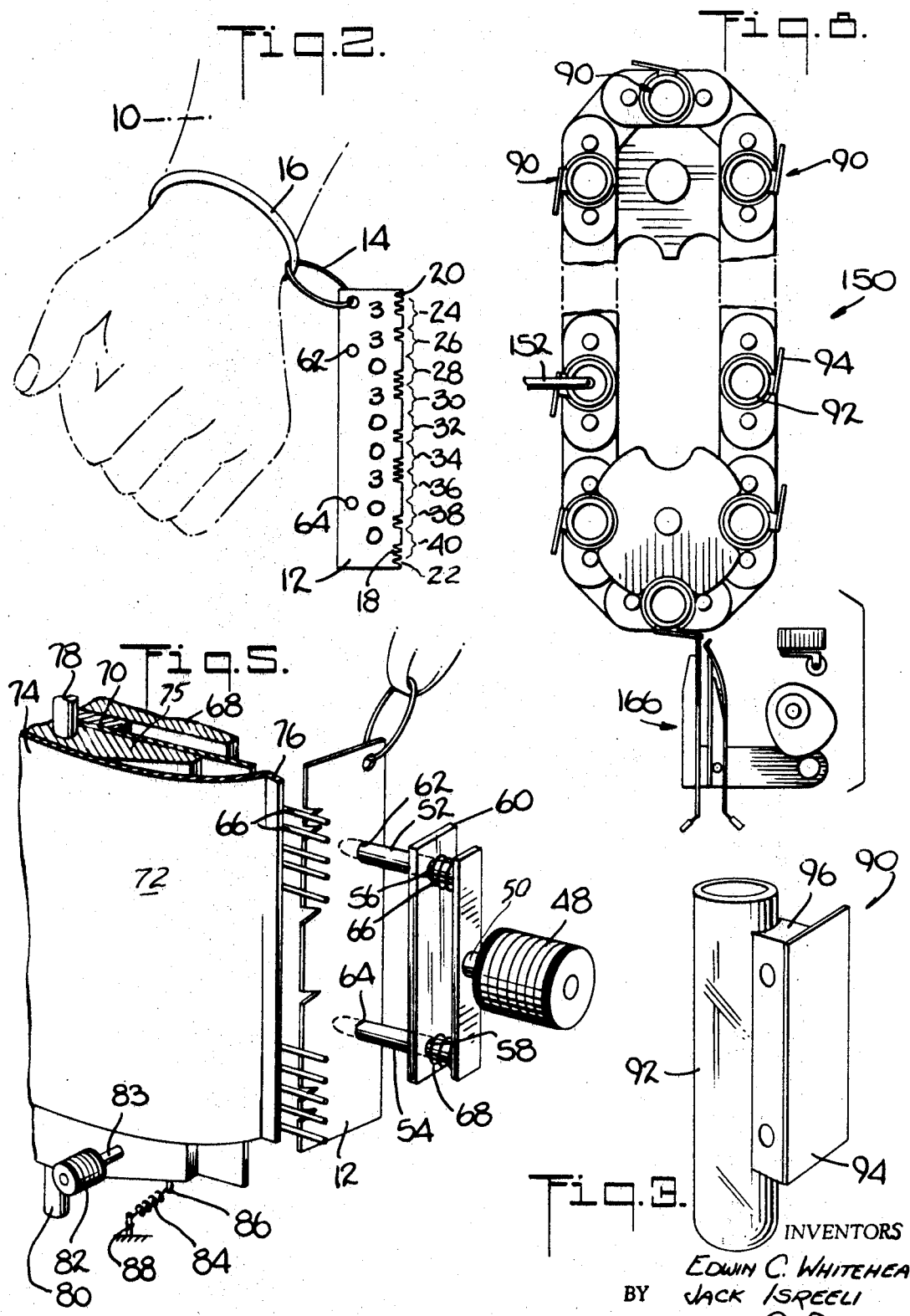

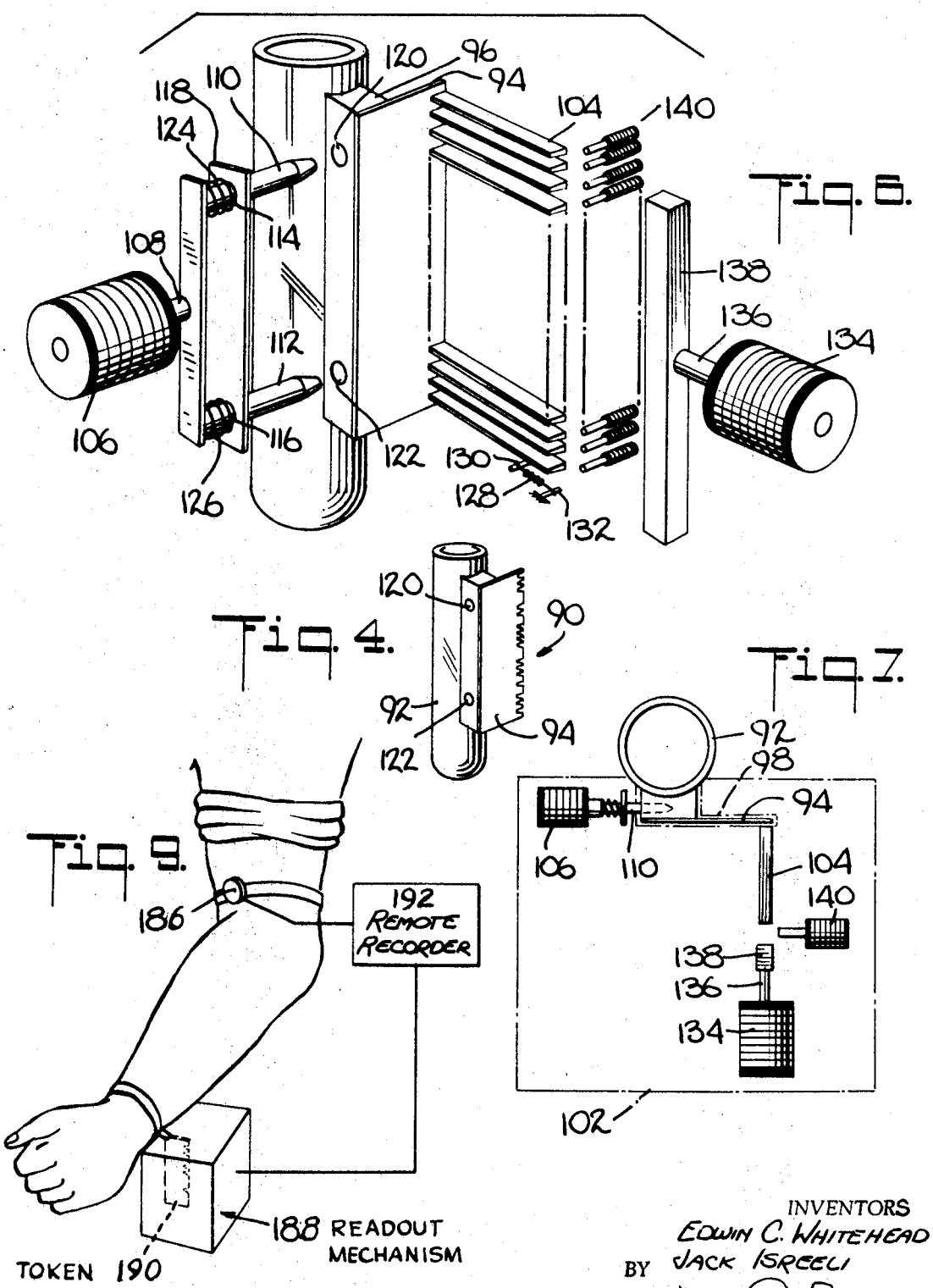

3,523,522

APPARATUS FOR CORRELATING BODY FLUID SAMPLES WITH RESPECTIVE SOURCE INDIVIDUALS

This application relates to the analysis of biological fluids and especially to the correlation of the source individual with the fluids taken therefrom.

The performance of clinical analysis on the biological fluids of individuals, such as patients in hospitals, has become routine. A plurality of analyses may be ordered for a large number of fluid samples taken from respective patients. These analyses are advantageously performed automatically, as described by Skeggs, et al in "Clinical Chemistry," vol. 10, No. 10, October 1964, pp 918-936. Each fluid sample is disposed in a container, which container is disposed in a sampler which may accommodate up to 250 containers. The fluid sample is automatically extracted from each container in turn, and the fluid samples are automatically analyzed seriatim. Each fluid sample may itself be automatically subdivided, and a separate analysis may be performed on each subdivision. A major problem which is presented by this processing of large numbers of samples is that of ensuring that each sample and the result of the analysis thereof are always related to the correct source individual, since an error may very well be fatal.

In the Isreeli application, Serial No. 391,093, filed August 21, 1964, assigned to a common assignee there is shown a sample container which is provided with indicia uniquely identifying this container, and an automatic sampler, analyzer and recorder assembly which is adapted to read out the indicia and to record these indicia in correlation with the analysis results.

It is an object of this invention to provide an apparatus for automatically correlating the indicia on the sample container with the identity of the source individual.

It is another object of this invention to provide an apparatus for automatically identifying the bearer with respect to a mechanized surrounding.

A feature of this invention is the provision of an element or token which is fixedly attached to an individual and which bears machine readable indicia providing a unique identification for this individual for use with a mechanism for reading such indicia and for displaying such identification.

Another feature of this invention is the provision of an element or token which is fixedly attached to a source individual and which bears machine readable indicia uniquely identifying this individual; a sample container for receiving biological fluid from this individual; and a mechanism for reading out the indicia from said element and for providing said container with correlated machine readable indicia contemporaneously with the withdrawal of the biological fluid from this individual into said container.

The other objects, features and advantages of this invention will become apparent by reference to the following description of the invention taken in conjunction with the accompanying drawings in which:

FIG. 1 is a perspective view of a system embodying this invention;

FIG. 1A is a diagrammatic view of the system of FIG. 1;

FIG. 2 is a perspective view of the element which is attached to the source individual and which bears machine readable indicia;

FIG. 3 is a perspective view of a sample container before use;

FIG. 4 is a perspective view of the sample container after receipt of source identifying indicia;

FIG. 5 is a perspective view of an apparatus for reading the indicia on the element;

FIG. 6 is a perspective view of an apparatus for providing the indicia to the sample container;

FIG. 7 is a plan view of the structure of FIG. 6;

FIG. 8 is a plan view of a sampler used for conveying a plurality of sample containers; and FIG. 9 is a perspective view of an apparatus for remotely indicating the identity of an individual.

A source individual has attached to a limb 10 of his body a token or element 12 having machine readable indicia thereon. The token is advantageously flexibly secured by an intermediate linkage 14 to a bracelet 16 which non-removably encircles the limb. Of course, the bracelet may be severed and thereby removed from the limb. However, it is desirable that when the patient is initially admitted to the hospital he will be provided with a token which will uniquely identify him with respect to all other patients, and that this token shall be non-disassociable from this patient during his sojourn in the hospital. Thus this token is available as an identification in each and any transaction between this patient and the hospital.

The token 12 is an elongated card-like element having a plurality of notches 18 along one edge thereof in a combinational-code array. The code utilized may be a two out of five code having five notch positions for each decimal digit. The top-most and bottom-most notches 20 and 22 are utilized to check the alignment of the token in the readout mechanism during the readout operation. The group of five notch positions 24 just below the topmost notch provide the first decimal digit. The next five notch positions 26 provide the second decimal digit. The succeeding seven pluralities of five notch positions 28, 30, 32, 34, 36, 38 and 40 respectively provide the third through ninth decimal digits.

The readout mechanism 42 comprises a housing 44 having a slot 46 therein to receive the token 12 and suitable means to seize the token and lock it in place. The seizing means shown here comprise a solenoid 48 having a bifurcated armature 50. The ends of the bifurcation 52 and 54 respectively pass through two guide holes 56 and 58 in a guide plate 60 and have rounded-off, cone-shaped ends which respectively enter into two alignment and locking holes 62 and 64 in the token. The armature is normally biased away from the token by two compression springs 66 and 68 respectively mounted on bifurcation ends 52 and 54 and bearing against the guide plate 60. When the solenoid is energized the ends of the bifurcation enter into the holes in the token; thereby aligning the token and seizing the token within the readout mechanism. Within the housing is the readout mechanism which comprises a plurality of resilient feeler wires 66 which are clamped in a spaced apart planar relation, like the teeth of a comb, between two insulating blocks 68 and 70. The distal ends of the feeler wires extend beyond the edges of the blocks. A common bus 72, formed as curved sheet of metal, is fixed at one of its margins 74 to a block 75, and has a distal bent margin 76 which is slightly spaced from the plane of the distal ends of the feeder wires. The mechanism is pivotable about a vertical axis, provided by two pivots 78 and 80, into the block 75, by a solenoid 82 having an armature 83 which bears against the block 70. The mechanism is normally biased away from the token by a tension spring 84 which is fixed between a pin 86 on the block 70 and a pin 88 fixed to the housing 44. After the token 12 is inserted into the slot 46 of the housing 44, the solenoid 82 is energized to pivot the mechanism. The notched edge engages the plurality of feeler-wire 66. Those distal ends of the feeler-wires which are adjacent notches 18 enter into these notches. Those distal ends which are not adjacent notches, but rather are adjacent lands, are deflected by the edge of the token into contact with the bent margin of the common bus. When an electric potential is now applied to the common bus, the deflected feeler-wires will be energized, while the non-deflected feeler-wires will not be energized.

The sample container 90 is a module similar to that shown in Ser. No. 391,093, supra and comprises a vial 92 to which an elongated element 94 is fixed by a supporting boss 96. The vial may be molded of plastic with the boss 96 integral therewith, to which the elongated element 94 is fixed with one edge extending beyond the boss. Prior to use, the sample container 90 is as shown in FIG. 3. Contemporaneously with the withdrawl of a biological fluid from the source individual, the sample container 90 is loaded through a slot 98 in the housing 100 of a punch 102. Within the housing are a plurality of punch elements 104 for notching the marginal edge of the element 94, in a manner similar to the notching of the token 12. The punch 102 advantageously also serves as a fixture for supporting the sample container while it receives the biological fluid from the source individual. The punch 102 includes a seizing means which as shown here comprises a solenoid 106 having a bifurcated armature 108. The ends of the figurcation 110 and 112 respectively pass through guide holes 114 and 116 in a guide plate 118 and have rounded-off, cone-shaped ends which respectively enter into two alignment and locking cavities 120 and 122 in the boss 96 of the sample container. The armature 108 is normally biased away from the boss 96 by two compression springs 124 and 126 respectively mounted on the bifurcation ends and bearing against the guide plate 118. When the solenoid 106 is energized, the ends of the bifurcation enter into the cavities in the boss, thereby aligning the element 94 and seizing the sample container 90 to the punch 102. The elements 104 are slidably mounted in a row, and each element is biased away from the element 94 by a respective tension spring 128 which is fixed between a respective pin 130 on that punch element and a respective pin 132 fixed to the punch housing 100. A solenoid 134 has an armature 136 to which is fixed a common hammer 138. The hammer is slidable in suitable guides and biased away from the punch elements by suitable springs, not shown. A plurality of solenoids 140 each has an armature 142 flexibly coupled to an interposer element, not shown. When a solenoid 140 is energized it advances its interposer element between the respective punch element and the common hammer. When the hammer solenoid 134 is energized it advances the hammer towards the punch elements. The hammer strikes those interposer elements which have been advanced, thereby operating each of the respective punch elements to punch a corresponding notch in the element 94. Forty-seven punch elements and interposer assemblies are provided. The highest and the lowest assemblies are invariably operated to punch two alignment notches, and the remaining assemblies provide the two out of five, nine decimal position code. The readout mechanism is coupled to the punch so that the punch will punch a combinational code arrangement of notches which is identical to the arrangement of notches on the token. If it is desired to convert from one code scheme on the token to another code scheme on the element, a digital code converter 144 may be interposed between the readout mechanism 42 and the punch mechanism 102.

In use, the container is inserted into the punch 102, the token is inserted into the readout mechanism 42, and the solenoids 48 and 106 are energized, aligning and seizing the token and the container in the readout mechanism and the punch, respectively. The readout solenoid 82 and the common bus are then sequentially energized, energizing the feeler-wires in accordance with the arrangement of notches on the token. The highest and the lowest notches serve as alignment checks, and unless the feeler wires adjacent these notches are both deflected the read out and punch procedure will be interrupted. The feeler wires 66 are respectively coupled by a bundle of conductors 142 to the input of the digital code converter 144 whose output is coupled by a bundle of conductors 146 to the respective interposer solenoids 140 of the punch. In the arrangement here shown, the converter 144 energizes each interposer solenoid for which a corresponding feeler wire is not grounded, and the respective conductor 142 is not energized. The hammer solenoid 134 is now energized, operating those punch elements 104 which have been selected by the interposer solenoids to notch the edge of the element 96 on the vial. If a tube is used for withdrawing the biological fluid from the source individual, as shown, the container may be left in the punch fixture while the fluid is being withdrawn. If a rigid assembly is utilized which includes the sample container similar to a hypodermic syringe, then for convenience, the assembly is released from the punch and then immediately utilized to withdraw the biological fluid from the source individual. In either case, the identification number of the individual as displayed by his attached token is automatically transcribed, without the possibility of clerical error, onto the container. The solenoids of the readout mechanism are deenergized after the punching operation, either before or after the biological fluid has been withdrawn. After the biological fluid is disposed within the container, the container is sealed.

The sealed containers, each having machine readable indicia identifying the respective source individual of the biological fluid contained therein, are then suitably preprocessed for analysis, as by centrifuging, and are grouped for the particular tests to be run. The containers are disposed in a sampler 150 such as is shown in the Isreeli application supra, and in the U. S. patent application of Milton H. Pelavin, Serial No. 408,026 filed Nov. 2, 1964, assigned to a common assignee, now Patent No. 3,419,879.

Each sample is off-taken sequentially from its container by an off-take mechanism 152 and fed into a multiple analyzer as shown in the Pelavin application supra. The sample is analyzed for different constituents if desired, by automatically dividing the sample into subportions and analyzing each subportion for a different constituent. Signals responsive to the concentration of each constituent are fed to a buffer storage means 156 which is read by a scanner 158 and the signals sequentially fed through a suitable analogue to digital converter 160 to a format control 162 and thence to a recording means 164. Contemporaneously with this signal readout and recording, the container 90 which originally held the sample engages a readout mechanism 166 similar to the readout mechanism for the token. The readout mechanism provides signals responsive to the identification number on the container, which are fed through a digital code converter 168 to the format control and thence to the recording means 164, all under the control of suitable timing and control logic 170. The recording means 164 then produces a unit record or patient profile document 172, or a document for computer or business machine entry 174. The business machine or computer 176 can then provide any compilation of data required, such as abnormality detection and printout 176, updated patient records 178, billings 180, periodic reports 182, and statistical studies 184.

While the use of the token and the readout mechanism has been illustrated in combination with a sample analysis system, it will be appreciated that there are other advantageous uses therefor with respect to identifying media from individuals. The use of automatic monitoring devices is rapidly becoming commonplace in hospitals. Various sensors 186 may be attached to the patient for the purposes of providing media such as physiological signals responsive to the blood pressure, heart beat, respiration, temperature, etc. to remote recorders and/or indicators. According to another embodiment of this invention a readout mechanism 188 is provided which receives the token 190 of the patient during the interval that he is being monitored and provides signals responsive to the identification number of the patient to the remote recorder 192. Thus the monitors are positively related to the specific patient, rather than to a specific bed upon which any patient may be disposed.

We claim:
1. An apparatus comprising:
   first means, including means for attachment to a media source individual, having indicia for identifying said individual;
   second means for receiving media from said individual, along with associate means for transferring said media from said individual to said second means;
   and third means, coupled to said first means and said second means, for reading said indicia of said first means while said first means is attached to said individual, for providing signals responsive to said read indicia, and for providing said second means with indicia responsive to said signals and thereby correlating said media received in said second means with respect to said individual.

2. An apparatus comprising:
   first means, including means for attachment to a media source individual, having a plurality of machine sensible indicia in a combinational-code array for identifying said individual;
   second means for receiving a biological sample fluid from said individual, along with associated means for transferring said biological sample fluid from said individual to said second means;
   and third means, coupled to said first and said second means, for reading said indicia of said first means while said first means is attached to said individual, for providing signals responsive to said indicia, and for providing said second means with indicia in a combinational code array responsive to said signals and thereby correlating said fluid received in said second means with respect to said individual.

3. An apparatus comprising:
   first means, including means for attachment to a media source individual, having a plurality of machine sensible indicia in a combinational code array for identifying said individual;
   additional means for operative coupling to said individual for receiving physiological information from said individual and for providing signals responsive to said information;
   second means, coupled to said additional means, for receiving said information responsive signals therefrom and for recording signals responsive thereto and thereby responsive to said physiological information; and
   third means, coupled to said first and said second means, for reading indicia of said first means while said first means is attached to said individual, and for providing said second means with signals responsive to said indicia.

4. An apparatus comprising:
   a token, including means for attachment to an individual, having a plurality of notches therein in a unique combinational array for identifying said individual;
   sensing means for operative coupling to said individual for sensing physiological information from said individual and for providing signals responsive to said information;
   means, coupled to said sensing means, for receiving said information responsive signals and for recording signals responsive thereto and thereby responsive to said physiological information; and
   read out apparatus, coupled to said token and said receiving and recording means, including a plurality of movable elements for sensing said notches and for providing said recording means with signals responsive thereto while said token is attached to said individual.

5. An apparatus comprising:
   a token, including means for attachment to an individual, having a plurality of indicia therein in a unique combinational array for identifying said individual;
   container means for receiving a biological sample fluid from said individual, along with associated means for transferring said biological sample fluid from said individual to said container means;
   recording means for receiving and for supporting said container means, and having a plurality of elements for providing said container means with indicia; and
   read out means for receiving said token, coupled to said recording means, and having a plurality of elements for sensing said indicia of said token and for providing said recording means with signals responsive thereto while said token is attached to said individual, for causing said elements of said recording means to provide said container means with indicia in unique combinational array and thereby correlating said fluid received in said container means to said individual.

6. An apparatus comprising:
   a token, including means for attachment to an individual, having a plurality of notches therein in unique combinational array for identifying said individual;
   Container means for receiving a biological sample fluid from said individual, along with associated means for transferring said biological sample fluid from said individual to said container means;
   a multi-element punch for receiving and for supporting said container means, and having a plurality of elements for providing said container means with notches; and
   read out means, coupled to said punch, for receiving said token, and having a plurality of elements for sensing said notches in said token and for providing said punch with signals responsive thereto while said token is attached to said individual, for causing said elements of said punch to provide said container means with notches in unique combinational array and thereby correlating said fluid received in said container means to said individual.